(12) United States Patent
Sridhar et al.

(10) Patent No.: US 8,214,767 B2
(45) Date of Patent: Jul. 3, 2012

(54) METHOD AND COMPUTER PROGRAM PRODUCT FOR GENERATING SHORTCUTS FOR LAUNCHING COMPUTER PROGRAM FUNCTIONALITY ON A COMPUTER

(75) Inventors: Muralikrishna Sridhar, Leeds (GB); Dinesh Mandalapu, Karnataka (IN); Naveen Sundar Govindarajulu, Tamil Nadu (IN); Sriganesh Madhvanath, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 829 days.

(21) Appl. No.: 12/351,595

(22) Filed: Jan. 9, 2009

(65) Prior Publication Data

US 2009/0183124 A1 Jul. 16, 2009

(30) Foreign Application Priority Data

Jan. 14, 2008 (IN) .............................. 132/CHE/2008

(51) Int. Cl.
 *G06F 3/048* (2006.01)
 *G06F 3/00* (2006.01)
(52) U.S. Cl. .......................... 715/847; 715/704; 715/745
(58) Field of Classification Search .................. 715/847, 715/704, 745
See application file for complete search history.

(56) References Cited

U.S. PATENT DOCUMENTS

| | | | |
|---|---|---|---|
| 6,690,392 B1 * | 2/2004 | Wugoski | 715/744 |
| 6,802,052 B1 * | 10/2004 | Andrews | 717/100 |
| 7,913,189 B2 * | 3/2011 | Baba | 715/847 |
| 2001/0017632 A1 * | 8/2001 | Goren-Bar | 345/744 |
| 2002/0122076 A1 * | 9/2002 | Nakaki | 345/847 |
| 2003/0052908 A1 * | 3/2003 | Katz et al. | 345/704 |
| 2010/0281506 A1 * | 11/2010 | Schmidt et al. | 725/46 |

* cited by examiner

*Primary Examiner* — William Bashore
*Assistant Examiner* — Andrea Long (57) ABSTRACT

The present application discloses a method for generating a shortcut for launching computer program functionality on a computer. The method comprises the steps of monitoring a sequence of user actions resulting in the launch of the functionality; determining a launch frequency of the functionality; determining a complexity rating for the launch; comparing the launch frequency and the complexity rating with a predefined criterion; and generating the shortcut for activating the functionality if the predefined criterion is met. The present application further discloses a computer program product implementing the above method and a computer comprising such a computer program.

25 Claims, 4 Drawing Sheets

METHOD AND COMPUTER PROGRAM PRODUCT FOR GENERATING SHORTCUTS FOR LAUNCHING COMPUTER PROGRAM FUNCTIONALITY ON A COMPUTER

CROSS-REFERENCE TO RELATED APPLICATION

This application claims priority to Indian Patent Application No. 132/CHE/2008, entitled "METHOD AND COMPUTER PROGRAM PRODUCT FOR GENERATING SHORTCUTS FOR LAUNCHING COMPUTER PROGRAM FUNCTIONALITY ON A COMPUTER", filed on Jan. 14, 2008, which is hereby incorporated by reference in its entirety.

Computer users perform a large number of complex and repetitive actions such as traversing down a folder structure to access a file or folder nested deeply in the user's folder structure, going through a series of menus to access an item or command in an application, and so on. Most of these actions can be simplified through the use of shortcuts. In this context, simplification implies the reduction of effort required from the user to launch program functionality.

Shortcut systems that support predefined shortcuts as well as user defined shortcuts of various kinds, such as keyboard-based shortcuts, display icon-based shortcuts, mouse or pen gesture-based shortcuts and so on, already exist and are often part of operating systems such as Microsoft Windows®. In such systems, the user may use already existing shortcuts or create new shortcuts. The creation of a new shortcut typically causes the system to associate the shortcut to an action such as launching an application or opening a file. Shortcuts can also be created for a series of actions instead of just a single action. A shortcut for a series of actions is known as a "Macro". These shortcut systems rely on the user's motivation and manual effort for the creation and management of shortcuts.

However, a problem associated with the available methods is that the manual creation of shortcuts is relatively complex and involves a significant effort from the user. For example, under Microsoft Windows®, in order to create a desktop shortcut icon, the user has to first position the mouse on the desk top and subsequently has to click the right hand mouse button to create a shortcut icon from the context menu. In addition, the user has to go through a series of dialog boxes to locate the actual command or application and associate it with the created shortcut icon. The above described process of creating shortcuts can be perceived by the user to be very cumbersome. The same holds for creating keyboard shortcuts in Windows.

Consequently, even if users are aware of the available methods to create shortcuts, very few users create and use their own shortcuts because of the perceived cumbersome nature of the creation process. Moreover, the user does not have any guidance on what shortcuts if defined would be useful, and has to rely largely on his or her own experience.

In addition, since the user's pattern of use of different applications changes over time, e.g. during a period of preparation for project reviews, presentation generating software programs such as MS PowerPoint® may be heavily used, during which period manually defined shortcuts for other functionalities may fall into disuse, whereas a demand for new shortcuts related to the task at hand may develop. The portfolio of software applications installed on the user's computer system may also change over time, which may also lead to shortcuts becoming redundant. The overhead experienced by a user from the continuing management of a shortcut portfolio may also be a major deterrent to the definition and use of such shortcuts. Embodiments of the present invention seek to overcome at least some of the aforementioned drawbacks.

Embodiments of the invention are described in more detail and by way of non-limiting examples with reference to the accompanying drawings, wherein:

It should be understood that the Figures are merely schematic and are not drawn to scale. It should also be understood that the same reference numerals are used throughout the Figures to indicate the same or similar parts.

Figure 1:
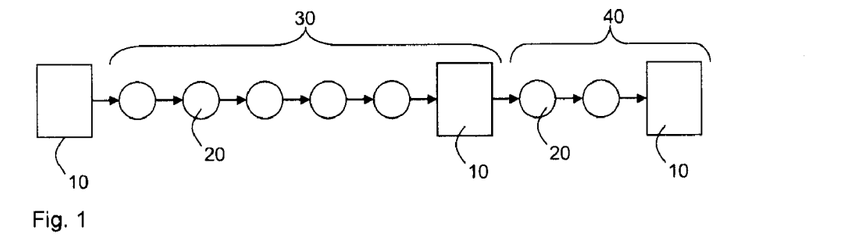
FIG. 1 schematically depicts an example of user action flow when using a computer.

FIG. 1 shows a flow of actions of a user when operating a computer. In FIG. 1, the user performs a number of launch actions 10 for launching different types of computer program functionality.

In the context of the present invention, a user action is an input provided by the user to a computer peripheral and received by the computer, such as a key stroke, a mouse click or mouse movement, a touch in case the computer is provided with a touch-sensitive peripheral such as a touch-sensitive pad or screen, composite actions such as double-clicking an icon, dragging an icon, using multiple keys for defining an action, and so on.

In the context of the present invention, launching computer program functionality is not limited to starting up a software program on the computer, but also covers launching a function within a software application such as a drawing function in drawing program, a text editing function in a word processor, a web page launch in an internet browser, an e-mail generating function in an e-mail management program and so on. Generally speaking, a 'launch' can include any kind of action terminating a sequence of actions, e.g. actions involving the menus of the software application. Further examples of a launching function include launching a web service, launching an embedded device user interface or functionality within such an interface, and so on. Other examples will be apparent to the skilled person.

In order to be able to launch such program functionality, the user will further have to execute a number of non-launch actions 20, e.g. navigation actions. In FIG. 1, a first sequence 30 of actions leading to the launch of the second program functionality comprises five non-launch actions 20 and a launch action 10, whereas the launch of the third program functionality comprises a second sequence 40 of actions including two non-launch actions 20 and a launch action 10. Because the first sequence 30 requires a larger total number of actions than the second sequence 40, the first sequence 30 is usually perceived by the user as being more complex than the second sequence 40. It will be appreciated that alternative approaches for interpreting the complexity of a sequence of non-launch actions may be used instead of or in combination with the above approach. For instance, the effort required to perform a non-launch action may also be taken into consideration, e.g. the number of simultaneously depressed keys, the distance travelled by a mouse cursor and so on.

Figure 2:
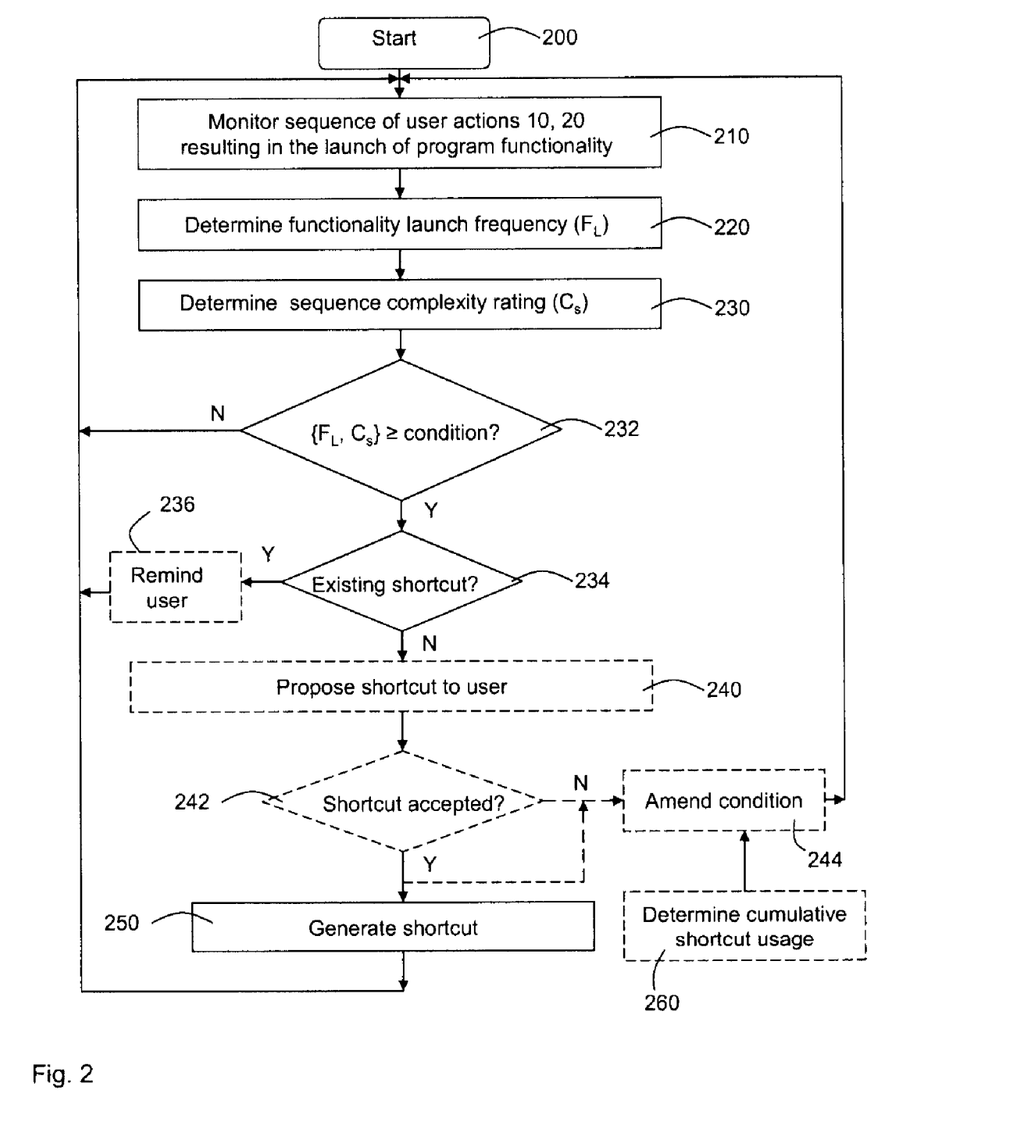
FIG. 2 depicts a flowchart of an aspect of a method in accordance with an embodiment of the present invention.

FIG. 2 shows a flowchart of an embodiment of the method of the present invention. The method starts in step 200. In case of the method being implemented by a computer program, the start 200 of the method is typically the result of the computer program being launched, or the shortcut generation functionality being activated within the computer program. Such a computer program may be an operating system, a software application, an interface and so on.

Upon start-up, the method will monitor user actions leading to the launch of computer program functionality in step 210. This functionality may for instance be the launch of a function of the same computer program that implements the method, the launch of a different computer program or the launch of a function in a different computer program. A number of non-limiting examples of such actions is given below.

A computer user may perform a number of actions ultimately leading to the launch of a file viewer for viewing a text file, such as a number of navigation steps concluded by double-clicking an icon of the text file, e.g. launching Windows Explorer® and navigating to My Documents→My Reports→Cars→Recent Models and double-clicking the file Ford_Focus.doc, which launches Microsoft Word®.

A computer user may perform a number of steps followed by activating a command to select a text editing function such as double underlining selected text in a word processing program.

A computer user may perform a number of navigation steps followed by the selection of an URL to gain access to a webpage in a web browser.

It will be appreciated that many more examples will be apparent to the skilled person.

Upon the launch of computer program functionality, the method continues by determining a launch frequency for the launched functionality in step 220 and a complexity rating for the sequence of actions leading to the launch of the functionality in step 230. To this end, the method may access a list of launch frequency and complexity data resident in the memory of the computer. It will be appreciated that the design and implementation of such a list belongs to the routine skills of the skilled person in this technical field, and that such a list may be implemented in any suitable way. A non-limiting example of such a list is given below.

| Functionality | 1st launch date | Number of launches | Launch frequency | Complexity rating |
|---|---|---|---|---|
| F1 | 13/10/2007 | 22 | 1.33 | 4.11 |
| F2 | 09/12/2006 | 77 | 0.77 | 1.89 |
| . | . | . | . | . |
| . | . | . | . | . |
| . | . | . | . | . |
| Fn | 12/11/2005 | 111 | 0.58 | 3.22 |

In step 220, the method identifies the functionality launched by the most recent sequence of user actions. The counter of the number of launches is incremented and the launch frequency calculated, for instance by dividing the launch counter value by the time lapsed between the first occurrence and the most recent occurrence of the functionality launch. Alternatively, the launch frequency may be defined by counting the number of launches in a predefined time window, such as one or more contiguous periods of computer activity, a time period, e.g. one or more hours, days, weeks, months, and so on. The table may be stored in a separate file that is loaded into the memory of the computer upon launch of the computer program implementing the shortcut generating method of the present invention.

The complexity rating may be calculated in a number of suitable ways with varying levels of sophistication. For instance, the complexity rating may simply be the number of non-launch actions 20 registered between the most recent functionality launch action 10 and the previous functionality launch action 10. For instance, in case of the sequence 30, the complexity rating would be five. A more sophisticated way of determining a complexity rating would be to take user effort into consideration, such as the effort it takes to perform a user action. For instance, an action requiring a plurality of keyboard keys to be used is a more complex action than an action requiring the use of a single key only.

The difference in comfort levels to engage respective combinations of a certain number of keys may also be taken into consideration. For instance, the two-key combination ALT+X may be perceived by a user to be more comfortable than the two-key combination ALT+Y, in which case the latter key combination may be given a higher complexity rating. A combination of simultaneously engaged keys, e.g. CTRL+ALT+DEL may be perceived as more complex than a sequential number of key strokes, e.g. 'r' 'u' 'n', which may also be reflected in the complexity rating. Furthermore, a key press sequence in which keys are repeated close together may be perceived as less complex than a key press sequence in which all the keys are distinct e.g. 'g' 'o' 'o' 'd' versus 'n' 'i' 'c' 'e'.

Similarly, an action requiring a large displacement of a mouse cursor is a more complex action than an action requiring a small displacement of a mouse cursor. In such a more sophisticated approach, each action may have an individual complexity score, with the scores of at least some actions being multiplied by a weighting factor based on the required user effort to perform the use action.

In addition, the user's comfort levels with executing a number of non-launch actions may be taken into consideration. For instance, a user may demonstrate a high level of comfort with executing potentially complex individual non-launch actions or potentially complex sequences of non-launch actions. Such comfort levels may be expressed by the time it takes the user to execute the non-launch action(s). For instance, a user taking a relatively long time to execute one or more non-launch actions may perceive these actions to be more complex than a user who executes these actions relatively quickly. The user comfort level may be included in the calculation of the complexity rating.

In case the user's comfort levels are taken into consideration, a computer program implementing this embodiment of the present invention may comprise a number of predefined shortcuts. The monitoring of the user's comfort levels may be used to disable and/or remove those shortcuts that prove to be of limited use to the user.

The complexity rating may be based on the sum of the individual complexity scores. The explanation of the complexity factors influencing a complexity scores has been limited to the above non-limiting examples for reasons of brevity only. It will be appreciated by the skilled person that any suitable measure reflecting a user's perception of difficulty and/or discomfort associated with performing a non-launch action may be used instead of or in combination with the above examples.

Preferably, the complexity rating should be based on the essential non-launch actions 20. Essential non-launch actions 20 comprise the minimum set of actions that must be performed to enable the execution of a launch action 10. This for instance excludes the non-launch actions 20 where the user navigated up and down a directory tree a number of times to locate the functionality to be launched. The determination of essential non-launch actions 20 may be based on hand-coded rules or on observation of user behavior over a period of time. The latter may for instance be realized by storing the complexity ratings of individual functionality launches and removing those ratings from an average complexity rating calculation that are outside a statistical spread between the individual ratings.

Sometimes the number of non-launch actions 20 may be determined to be zero despite the launch action 10 being deeply nested in e.g. a directory tree. In such a case, the complexity rating of the first previous launch action 10 preceded by one or more non-launch actions 10 may be used as the complexity rating of the current launch action 10. This is particularly useful if the user has performed a number of navigation actions to reach a location from which a plurality of functionalities can be launched, and subsequently launches several different functionalities from that location. This will for instance ensure that a shortcut will be generated for all activated functionality in that location.

In step 230, the method may use an isolated complexity rating calculated from the number of user actions of the most recent launch. Alternatively, an average complexity rating may be determined by retrieving the average complexity rating from the table and updating the complexity rating based on the complexity rating determined for the most recent launch of the functionality. The use of an average complexity rating is particularly useful if different launches of the same functionality show a substantial variation in the non-launch user actions required for the launch, for instance because the user has started navigating to the launch command from significantly different starting locations.

In a next step 232, the determined activation frequency and complexity rating are compared with a predefined condition to determine if the generation of a shortcut would be useful. This comparison may be performed in a number of suitable ways. In an embodiment, the product of the activation frequency and complexity rating may be taken and compared with a predefined threshold. In another embodiment, the activation frequency and complexity rating are multiplied with respective weighting factors and the sum of these products is compared with a predefined threshold. This is particularly useful if these two factors are considered to have a different importance in determining whether or not a shortcut should be generated. In yet another embodiment, the activation frequency and the complexity rating are compared with respective predefined thresholds, e.g. a frequency threshold and a complexity threshold, with the predefined condition being met when both the activation frequency and the complexity rating reach their corresponding thresholds. This avoids generation of shortcuts for infrequently used functionality having a very high complexity rating or for frequently used functionality having a very low complexity rating. However, in other situations it may be useful to compare the product of the frequency and the complexity rating with a predefined threshold. Many other suitable approaches will be apparent to the skilled person.

The predefined condition, which may be a global condition applying to all functionality or a local condition specific to a single functionality or a single group or class of functionality, may be defined in any suitable way. For instance, the predefined condition may be derived empirically from observing the program functionality launch behavior of a group of users over a set time period.

In case it is determined in step 232 that the predefined condition is not met, the method returns to step 210. However, if the condition is met, the method proceeds to step 234 where it is checked if a shortcut already exists for the launched functionality. If this is the case, this means that the user of the computer decided to launch the functionality without using the shortcut, which may be an indication that the user has forgotten the availability of the shortcut. The user may be reminded in step 236 that such a shortcut exists, e.g. by displaying a message on the computer display, after which the method returns to step 210. However, such a reminder may be skipped.

If no shortcut yet exists, the method proceeds to step 240, in which the user is prompted with a proposal to generate a shortcut. The response of the user is checked in step 242, followed by a generation of a shortcut in step 250 if the user has accepted the proposal. In a preferred embodiment of step 250, the user defines the shortcut in step 250. Alternatively, the computer program implementing the method shown in FIG. 2 may omit prompting the user in step 240 and generate a shortcut in step 250, after which the user is notified of the generation of the shortcut. The user may be given the option to accept or reject the generated shortcut. A further alternative may be the omission of steps 240 and 242, and directly asking the user to define a shortcut in step 250, which the user for instance may decline by canceling the request.

In an alternative embodiment, prior to prompting the user with the shortcut generation request, the method may include performing an analysis of the comfort level of the user with the performed sequence of non-launch actions up to the launch action. This sequence may include the launch action in an alternative embodiment. In case the user demonstrates a high comfort level in performing the sequence, e.g. the sequence has been performed relatively quickly, a decision may be taken not to generate a shortcut and return to step 210. In this alternative embodiment the user comfort level is evaluated separate to the complexity rating. However, as has been explained previously, the user comfort level may also be included in the calculation of the complexity rating, in which case such a separate evaluation step may be omitted. It is again emphasized that assessment of the user comfort level may be omitted altogether in yet another embodiment of this method.

Figure 3:
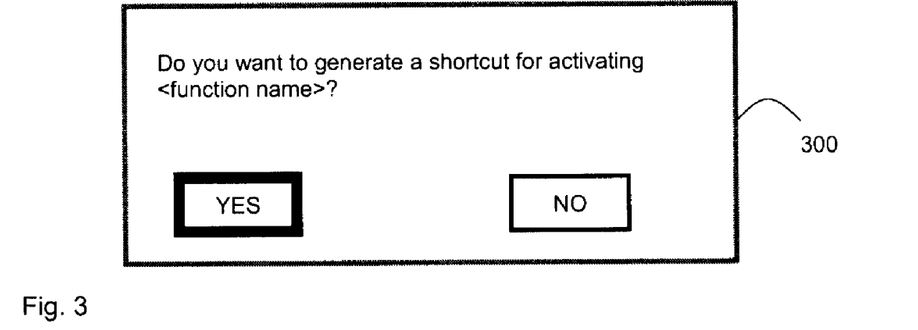
FIGS. 3-5 schematically depict examples of dialog boxes for allowing a user to define a shortcut in accordance with an embodiment of the present invention.
Figure 4:
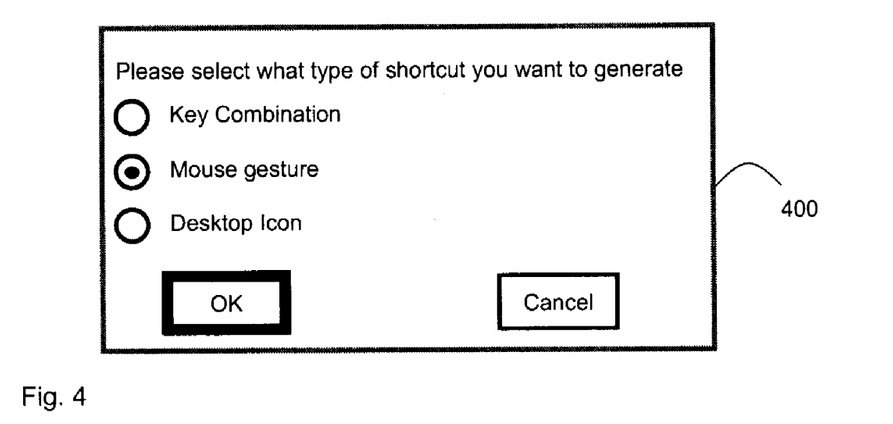
Figure 5:
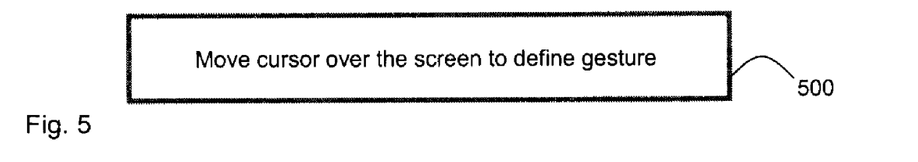

Steps 240 and 250 may be implemented in any suitable way. A non-limiting example is given in FIGS. 3-5. A dialog box 300 may prompt the user that a useful shortcut may be generated. If the user accepts the proposal, a dialog box 400 may offer the user a choice of what type of shortcut the user wants to generate, after which a dialog box 500 may appear giving instructions on how to generate and save the shortcut.

Now returning to FIG. 2, in a further embodiment of the method of the present invention, the response of the user to the proposed generation of a shortcut as detected in step 242 may be used as feedback information regarding the user's comfort levels with using shortcuts. A rejected proposal to generate a shortcut may be interpreted as an indication that the user is not very comfortable with using shortcuts, and an accepted proposal may be interpreted as an indication of the opposite. This feedback information may be used to adjust the predefined condition used in step 232. The adjustment is shown in step 244. Typically, in case of an assumed low comfort level of the user with the shortcuts, the condition will be amended such that shortcuts are proposed less frequently, e.g. by increasing a threshold, whereas the condition will be amended to generate more shortcut proposals if the user is comfortable with using shortcuts.

Step 244 may be applied to all available conditions, e.g. global conditions, function-specific conditions. Alternatively, step 244 may be applied to all conditions related to a specific class of program functionalities. In yet another embodiment of the method of the present invention, the method may monitor the overall use of generated shortcuts by the user in step 260. For instance, in step 260, a cumulative use frequency CF of previously generated shortcuts may be determined as follows:

$$CF = \frac{\sum_{i=1}^{n} f(i)}{n}$$

wherein f(i) is the use frequency of the $i^{th}$ shortcut in a set of n shortcuts. Hence, an average cumulative use frequency is determined. This use frequency may be used as user knowledge information in step 244 to adjust the predefined condition accordingly; for instance, in case the cumulative use frequency is high, the predefined condition may be adjusted such that more shortcuts are proposed to the user, whereas in case of a low cumulative use frequency, the predefined condition may be adjusted in the opposite direction.

At this stage, it is pointed out that in accordance with an embodiment of the method of the present invention, the user's actions on the computer may be observed for a period of time before proposing shortcuts in order to determine the user's skill level based on his/her actions. This allows for adaptation to the user's skill levels before proposing any shortcuts. Typically, this is reflected in the definition of the initial condition to be used in step 232. This adaptation occurs without any feedback from the user; the computer system implementing this embodiment of the method of the present invention gets passively personalized to the user. This "Silent Personalization" of the shortcut proposal system can eliminate any annoyance or disturbance factor arising from the system popping up and proposing shortcuts to the user prematurely.

Relative measures, based on the system's observation of the user, can be used for complexity and frequency. The frequency and complexity values for same actions will differ across different users based on the respective users' usage history. Thus the same action performed in different systems (with respective users who differ significantly in their usage of the system) the same number of times will lead to different scores. Thus, whereas in one system performing an action a certain number of times in a certain time period might lead to the shortcut proposal system proposing a shortcut, in another system this may not be the case due to the different skill level of a different user.

Figure 6:
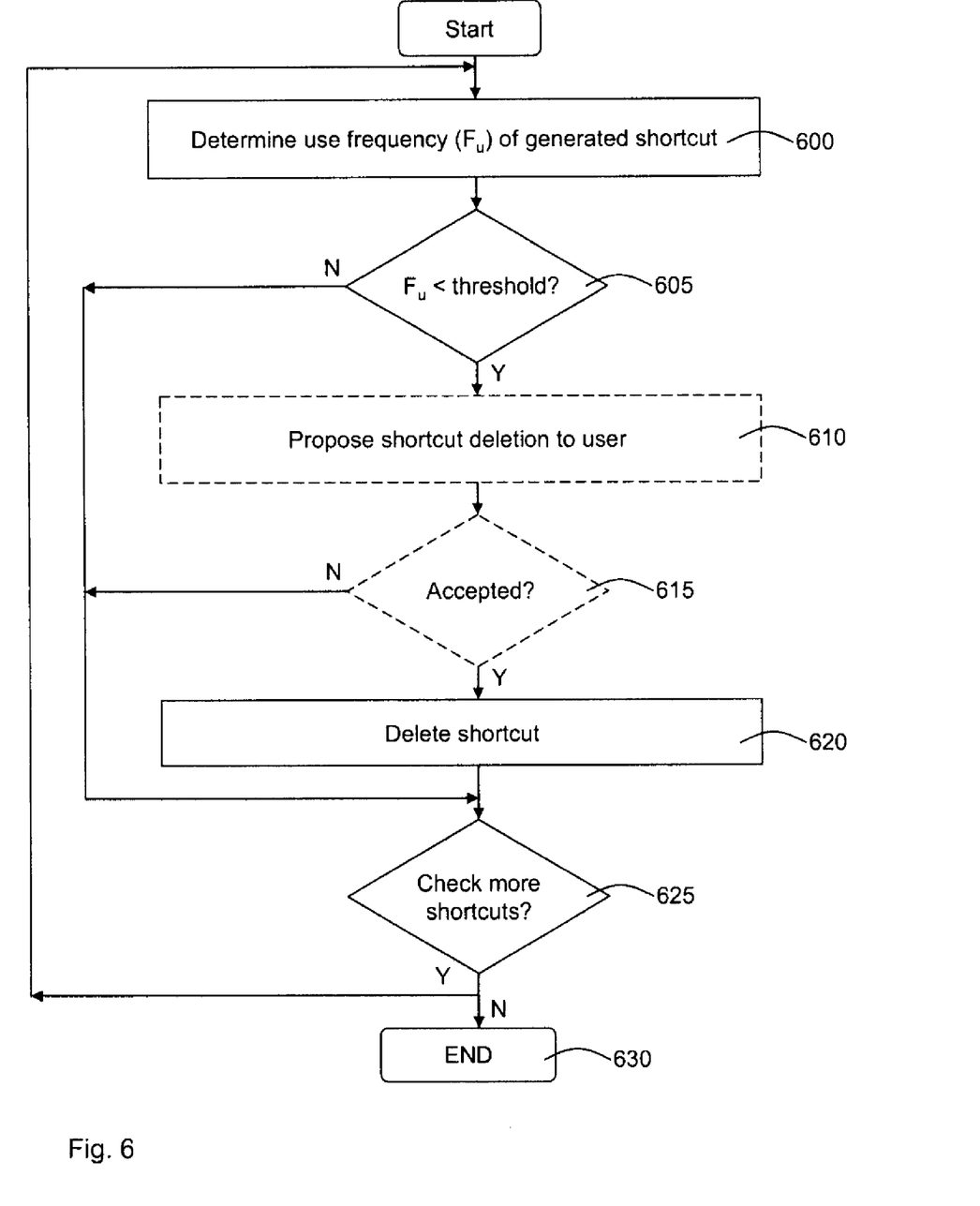
FIG. 6 shows a flowchart of another aspect of a method in accordance with an embodiment of the present invention.

As mentioned previously, a user of a computer will change programs and/or his program usage behavior over time. Consequently, some shortcuts, which were defined in the past, may no longer be of use to the user. This may lead to a large number of redundant shortcuts present on the computer system, which may be unwanted. In yet another embodiment of the method of the present invention, which is shown in FIG. 6, this problem is solved by pruning unused shortcuts from the system. In step 600, a use frequency (Fu) is determined for a shortcut. This may for instance be an actual frequency, i.e. a number of activations of the shortcut divided by a time period, or may be the determination of a contiguous time period during which the shortcut has not been activated. Such a time period may be determined by registering the last point in time at which a shortcut was activated and calculating the contiguous time period from the last point in time and the current point in time.

In step 605, it is checked if the use frequency of the shortcut has fallen below a further predefined threshold. If this is the case, the shortcut may be deleted in step 620, after which the method will check in step 625 if more shortcuts need checking before either returning to step 600 or terminating in step 630. In an alternative embodiment, the system will not automatically delete the shortcut, but will ask the user in step 610 if the user wants to delete the shortcut, after which the response of the user will be analyzed in step 615. If the user wants to delete the shortcut, the method will proceed to step 620. If the user does not want to delete the shortcut, the method will proceed to step 625. This shortcut pruning method may be implemented in any suitable way. For instance, it may be executed upon start-up of a computer program implementing an embodiment of the method of the present invention, or it may continuously run in the background of a computer on which said computer program has been launched.

Some or all of the aforementioned embodiments of the method of the present invention may be implemented in a computer program such as an operating system for a computer or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the internet, or any other suitable carrier.

The computer program may be advantageously be stored on a computer, such that the user of the computer benefits from the shortcut generation method implemented by the computer program when running on said computer. Such a computer may be connected to peripheral devices for registering user actions such as a computer mouse, a keyboard, a touch-sensitive screen or pad and so on.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim. The word "a" or "an" preceding an element does not exclude the presence of a plurality of such elements. The invention can be implemented by means of hardware comprising several distinct elements. The mere fact that certain measures are recited in mutually different dependent claims does not indicate that a combination of these measures cannot be used to advantage.

We claim:

1. A method for generating a shortcut for launching computer program functionality on a computer, comprising:
    monitoring a sequence of user actions resulting in the launch of the functionality;
    determining a launch frequency of the functionality;
    determining a complexity rating for the launch;
    comparing the launch frequency and the complexity rating with a predefined criterion; and
    generating the shortcut for activating the functionality if the predefined criterion is met;
    wherein the predefined criterion comprises a frequency threshold and a complexity threshold, and wherein comparing the launch frequency and the complexity rating with a predefined criterion comprises:
        comparing the launch frequency with the frequency threshold;
        comparing the complexity rating with the complexity threshold; and wherein the predefined criterion is met when both the frequency threshold and the complexity threshold are met.

2. The method as claimed in claim 1, wherein the complexity rating reflects a physical effort required to perform at least some of the user actions in said sequence.

3. The method as claimed in claim 1, wherein the sequence is terminated by a functionality launch action, and wherein determining the complexity rating comprises determining the number of actions between the current functionality launch action and the preceding functionality launch action.

4. The method as claimed in claim 3, further comprising using the complexity rating of the sequence of the preceding launch action as the complexity rating of the sequence of the current launch action if the number of actions between the current functionality launch action and the preceding functionality launch action is less than a predefined number.

5. The method as claimed in claim 1, wherein generating the shortcut further comprises:
prompting the user to approve the generation of said shortcut; and
generating said shortcut upon a positive response to said prompt.

6. The method as claimed in claim 5, further comprising:
monitoring responses of the user to respective prompts for approving the generation of respective shortcuts for activating respective computer program functionalities;
determining an approval rate from said responses; and
adjusting the predefined criterion in response to the determined approval rate.

7. The method as claimed in claim 5, wherein generating said shortcut upon a positive response to said prompt comprises:
prompting the user to define the shortcut; and
generating the shortcut based on the definition.

8. The method as claimed in claim 1, further comprising:
monitoring a use frequency of a generated shortcut;
comparing the use frequency with a further predefined threshold; and
deleting the shortcut if the use frequency has fallen below the further predefined threshold.

9. The method as claimed in claim 8, wherein generating the shortcut further comprises:
proposing to the user to delete said shortcut; and
deleting said shortcut upon a positive response to said proposal.

10. The method as claimed in claim 1, further comprising:
determining a cumulative use frequency of previously generated shortcuts; and
adjusting the predefined criterion in response to the determined cumulative use frequency.

11. The method as claimed in claim 1, further comprising:
checking if a shortcut already exists for the sequence; and
flagging the existence of the shortcut to the user.

12. The method as claimed in claim 1, wherein the predefined criterion is a global criterion.

13. The method as claimed in claim 1, wherein the predefined criterion is specific to the launched functionality.

14. The method as claimed in claim 1, further comprising defining the criterion based on user competence.

15. A non-transitory computer program product for generating a shortcut for launching computer program functionality when executed by a computer, said computer program product comprising program code to:
monitor a sequence of user actions resulting in the launch of the functionality;
determine a launch frequency of the functionality;
determine a complexity rating for the launch;
compare the launch frequency and the complexity rating with a predefined criterion;
generate the shortcut for activating the functionality if the predefined criterion is met;
determine a cumulative use frequency of previously generated shortcuts; and
adjust the predefined criterion in response to the determine cumulative use frequency.

16. The computer program product as claimed in claim 15, wherein the sequence is terminated by a current functionality launch action, and wherein to determine the complexity rating is to determine the number of actions between the current functionality launch action and the preceding functionality launch action.

17. The computer program product as claimed in claim 15, wherein the program code to generate the shortcut further comprises program code to:
prompt the user to approve the generation of said shortcut; and
generate said shortcut upon a positive response to said prompt.

18. The computer program product as claimed in claim 15, wherein to program code is further to:
monitor responses of the user to respective prompts for approving the generation of respective shortcuts for activating respective computer program functionalities;
determine an approval rate from said responses; and
adjust the predefined criterion in response to the determined approval rate.

19. The computer program product as claimed in claim 18, wherein the program code to generate said shortcut upon a positive response to said prompt comprises program code to:
prompt the user to define the shortcut; and
generate the shortcut based on the definition.

20. The computer program product as claimed in claim 15, wherein the program code is further to:
monitor a use frequency of a generated shortcut;
compare the use frequency with a further predefined threshold; and
delete the shortcut if the use frequency at least meets the further predefined threshold.

21. The computer program product as claimed in claim 15, wherein the computer program product comprises an operating system.

22. The computer program product as claimed in claim 15, wherein the computer program product is embodied on a non-transitory computer-readable data carrier.

23. A computer comprising the computer program product of claim 15.

24. A method for generating a shortcut for launching computer program functionality on a computer, comprising:
monitoring a sequence of user actions resulting in the launch of the functionality;
determining a launch frequency of the functionality;
determining a complexity rating for the launch;
comparing the launch frequency and the complexity rating with a predefined criterion; and generating the shortcut for activating the functionality if the predefined criterion is met;
wherein the predefined criterion comprises a predefined threshold, and wherein comparing the launch frequency and the complexity rating with a predefined criterion comprises:
generating a score comprising one of:
a sum of a weighted launch frequency and a weighted complexity rating; and a product of the launch frequency and the complexity rating; and comparing the score with the predefined criterion.

25. The method of claim 24, wherein generating a score comprising a sum of a weighted launch frequency includes multiplying the launch frequency with a first weight factor to generate the weighted launch frequency and multiplying the complexity rating with a second weight factor to generate the weighted complexity rating.

* * * * *

UNITED STATES PATENT AND TRADEMARK OFFICE
CERTIFICATE OF CORRECTION

PATENT NO.         : 8,214,767 B2                              Page 1 of 1
APPLICATION NO.    : 12/351595
DATED              : July 3, 2012
INVENTOR(S)        : Muralikrishna Sridhar et al.

It is certified that error appears in the above-identified patent and that said Letters Patent is hereby corrected as shown below:

In column 10, line 24, in Claim 18, delete "to" and insert -- the --, therefor.

Signed and Sealed this
Eighth Day of January, 2013

David J. Kappos
*Director of the United States Patent and Trademark Office*